United States Patent [19]

Handke et al.

[11] Patent Number: 5,544,725
[45] Date of Patent: Aug. 13, 1996

[54] VIBRATION DAMPER HAVING A SPRING PLATE, TUBE AND BASE WHICH ARE JOINED BY A WELD

[75] Inventors: Günther Handke, Euerbach; Georg Memmel, Forst, both of Germany

[73] Assignee: Fichtel & Sachs AG, Schweinfurt, Germany

[21] Appl. No.: 407,980

[22] Filed: Mar. 22, 1995

[30] Foreign Application Priority Data

Mar. 22, 1994 [DE] Germany .................. 44 09 661.5

[51] Int. Cl.⁶ .................. F16F 9/16; F16F 9/54; B60G 13/00; B62D 33/06
[52] U.S. Cl. .................. 267/221; 188/322.19
[58] Field of Search .................. 188/321.12, 321.11; 267/220, 221; 280/666, 668

[56] References Cited

U.S. PATENT DOCUMENTS

| | | |
|---|---|---|
| 3,181,852 | 5/1965 | Paller . |
| 3,206,184 | 9/1965 | Walker . |
| 3,353,813 | 11/1967 | Erdmann et al. ............... 267/221 |
| 3,385,589 | 5/1968 | Erdmann ............... 267/221 |
| 4,913,268 | 4/1990 | Parker et al. . |
| 5,265,902 | 11/1993 | Lewis ............... 280/666 |
| 5,350,044 | 9/1994 | Gelhausen ............... 188/322.12 |

FOREIGN PATENT DOCUMENTS

| | | |
|---|---|---|
| 0023967 | 2/1981 | European Pat. Off. . |
| 0399559 | 11/1990 | European Pat. Off. . |
| 1088022 | 3/1955 | France . |
| 2667019 | 3/1992 | France . |
| 1023345 | 11/1958 | Germany ............... 267/221 |
| 2645773 | 4/1978 | Germany . |
| 2802342 | 7/1979 | Germany . |
| 3741465 | 7/1988 | Germany . |
| 4007488 | 9/1991 | Germany . |
| 4130112 | 3/1992 | Germany . |
| 4127453 | 11/1992 | Germany . |
| 4122798 | 1/1993 | Germany . |
| 4131323 | 4/1993 | Germany ............... 267/221 |
| 4403196 | 8/1994 | Germany . |
| 62297141 | 6/1989 | Japan . |
| 0873193 | 7/1961 | United Kingdom . |
| 0899650 | 6/1962 | United Kingdom ............... 267/221 |
| 0971970 | 10/1964 | United Kingdom . |

*Primary Examiner*—Matthew C. Graham
*Attorney, Agent, or Firm*—Nils H. Ljungman and Associates

[57] ABSTRACT

Vibration damper which has a container tube which is closed on the end by a container base, whereby a suspension spring which encloses the vibration damper is supported on a spring plate, with connection mechanisms on the container tube and on a piston rod which can move axially inside the container tube, characterized by the fact that the spring plate, the container base and the container tube are connected to one another by a common connection configuration.

19 Claims, 11 Drawing Sheets

5,544,725

VIBRATION DAMPER HAVING A SPRING PLATE, TUBE AND BASE WHICH ARE JOINED BY A WELD

BACKGROUND OF THE INVENTION

1. Field of the Invention

This invention relates to a vibration damper which has a container tube which is closed on one end by a container base, whereby a suspension spring which encloses the vibration damper is supported on a spring plate, with connection mechanisms to the container tube and to a piston rod which moves axially inside the container tube.

2. Background Information

Such a vibration damper is disclosed in DE 41 30 112, for example. On this vibration damper, the spring plate is located on the base-side connection mechanism. The advantage of this arrangement is that a comparatively long suspension spring can be used, which results in a high level of suspension comfort when the vibration damper is used for the suspension of the passenger compartment of a motor vehicle.

But the particular disadvantage of the vibration damper disclosed in DE 41 30 112 is that a series of welding operations are necessary to fasten the connection mechanism and the spring plate. Moreover, the weld seams must be laid down in areas which are heat-sensitive, so that it is essentially impossible to prevent damage to the connection mechanism.

OBJECT OF THE INVENTION

An object of the invention is to realize a vibration damper with a base which eliminates the disadvantages of similar devices of the past, but which nevertheless makes it possible to fasten the spring plate in the vicinity of the base of the vibration damper.

Another object of the invention is to realize a vibration damper with a welded base which eliminates the disadvantages of similar devices of the past, but which nevertheless makes it possible to fasten the spring plate in the vicinity of the base of the vibration damper.

SUMMARY OF THE INVENTION

The invention teaches that this object can be accomplished by connecting the spring plate, the container base and the container tube to one another by means of a common weld seam configuration.

The welding work is advantageously reduced to a single weld configuration or to a single weld. The inevitable generation of heat essentially cannot cause any distortion of the components, since the welding point, above the floor but also through the container tube and the spring plate, can preferably be realized in a particularly rigid manner.

In one advantageous embodiment, the spring plate preferably has a sleeve body which encloses the container tube, whereby the sleeve body is oriented so that the base-side end surface of the sleeve body assumes an axial offset in relation to the end surface of the container tube. Further, the base can be fitted into the container tube, whereby a portion of the base extends axially outside the container tube, and the weld configuration is connected to the base at least by means of the end surfaces. A fillet weld can very easily be laid down, which reliably connects all the components to one another.

To limit the width of the weld seam and thereby increase the speed of the welding process, the axial offset can be selected so that the weld configuration is preferably realized at an angle which is greater than or equal to about 45 degrees, in relation to the principal axis of the vibration damper.

Alternatively, the spring plate, with the portion of the base extending outside the container and the end surface of the container tube, can preferably form a groove, inside which the weld seam system is realized. The groove can be easily and reliably filled with the weld metal, so that a good weld seam is produced.

The weld configuration in accordance with the invention makes it possible for the sleeve body of the spring plate to be a component of the connection mechanism on the container tube side. The number of parts can preferably be lower than in comparable devices of the past, and there is no weld seam in the heat-sensitive area.

One aspect of the invention resides broadly in a vibration damper, such as for a motor vehicle, the vibration damper comprising: a tube; a chamber disposed at least partially within the tube, the chamber containing a damping fluid; a piston rod sealingly projecting into the chamber and being axially displaceable within the chamber; a piston being attached to the piston rod, the piston being slidably disposed within the chamber to sealingly divide the chamber into first and second work chambers; apparatus for permitting fluid communication between the first chamber and the second chamber; the tube comprising a first end and a second end; the first and second end being disposed a substantial distance from one another; the chamber being substantially disposed between the first end and the second end of the tube; the chamber having a first end and a second end; the first end of the chamber being disposed near the first end of the tube; the second end of the chamber being disposed near the second end of the tube; the first end comprising first apparatus for connecting the vibration damper to a first body; the second end comprising second apparatus for connecting the vibration damper to a second body; a spring for extending the vibration damper; the spring comprising a first end and a second end; a spring plate disposed at the first end of the spring; the tube having an outer portion surrounding at least a portion of the chamber; a base being disposed at the first end of the tube for sealing the first end of the tube; the spring plate being disposed at the first end of the tube; a unitary connection connecting the spring plate, the tube, and the base together at the first end of the tube.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more that one patentably and non-obviously distinct invention, and maintains that this application may include more than one patentably and non-obviously distinct invention. The Applicants hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below, with reference to the embodiments illustrated in the accompanying drawings, in which.

DESCRIPTION OF THE PREFERRED EMBODIMENT

Figure 1:
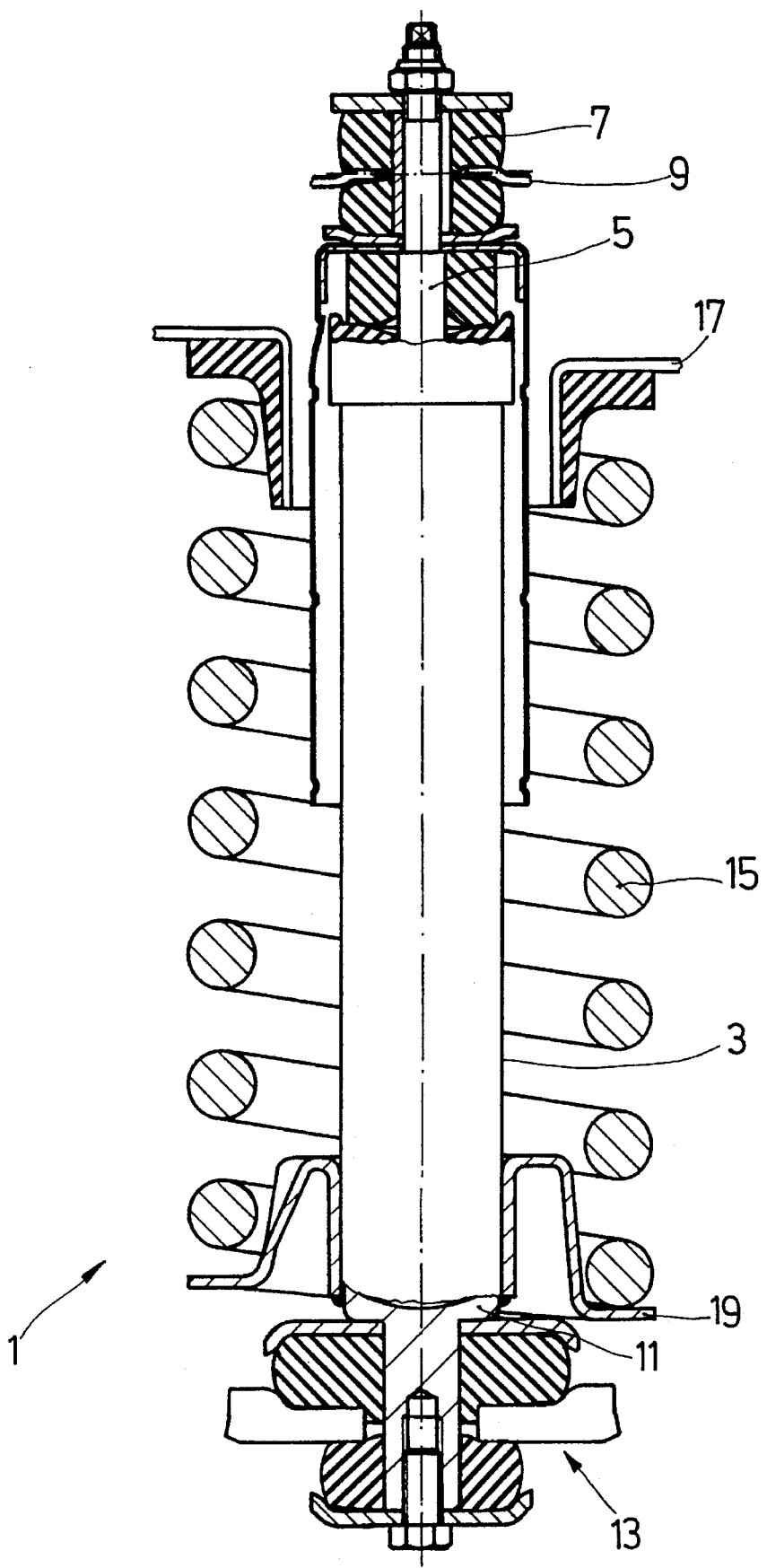
FIG. 1 shows an overall illustration of a vibration damper.

FIG. 1 shows a vibration damper 1, in the container tube 3 of which there can preferably be a piston rod 5. The piston rod 5 can move axially, and is supported by means of a connection mechanism 7 on a vehicle body 9. On the container tube side, a base can preferably have an additional connection mechanism 13 which is connected to a vibrating component, e.g. a vehicle axle or a vehicle passenger compartment. The vibration damper 1 can preferably be enclosed by a suspension spring 15, which suspension spring 15 is braced between spring plates 17, 19 corresponding respectively to the container tube side and to the vehicle body side.

Figure 1A:
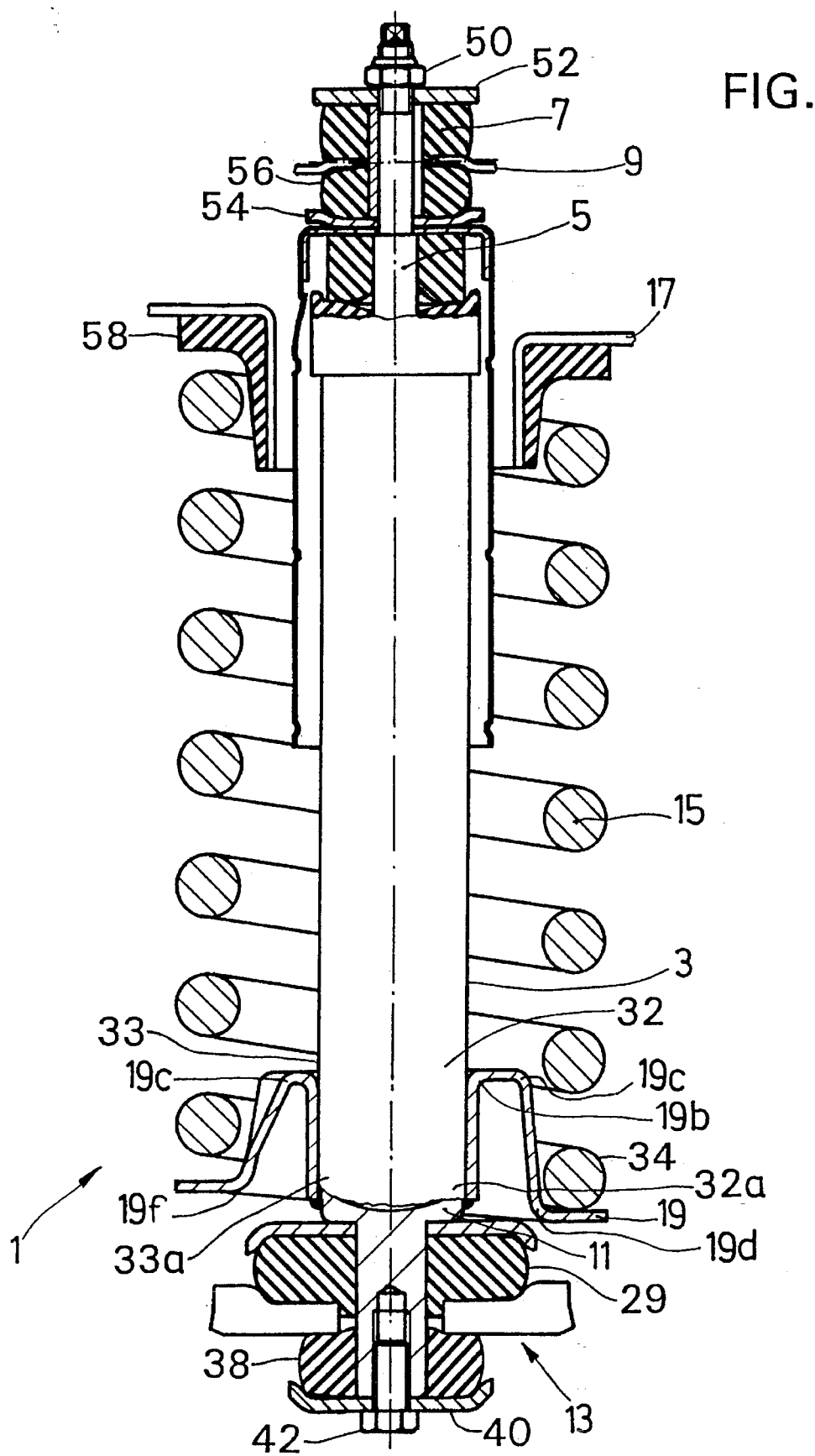
FIG. 1a shows an overall illustration of a vibration damper.

In FIG. 1a, the spring plate 19 can preferably be welded to the container tube 3 on the edges 32a, 33a of the container tube 3. The spring plate 19 than known spring plate 5, is also longer and also preferably extends lower than the known spring plates. On one side 32 of the container tube 3, the spring plate 19 extends up the side 32 of the container tube 3 in an essentially parallel manner, and is preferably in cylindrical contact with the outer surface of the container tube 3. The spring plate 19 can than bend or curve (illustrated as 19b), and a portion of the periphery of the spring plate 19 forms substantially a semi-rectangular configuration. The spring plate 19 then extends first outward from portion 19b, and then downward, that is the spring plate 19 turns, and extends away from the container tube 3 (illustrated as 19c and 19d). On the other side 33 of the container tube 3, the spring plate 19 can preferably extend up the side 33 of the container tube 3 in an essentially parallel manner. The spring plate 19 then preferably slopes downward at an angle (illustrated as 19e), then bends again and extends away from the container tube 3 (illustrated as 19f). In some embodiments the spring plate 19 can preferably form a substantially rectangular configuration, while in other embodiments the spring plate 19 can preferably form a triangular configuration.

FIG. 1a also illustrates a terminal end of a coil spring 34. Also present in one embodiment, are rubber or elastomer bushings or bearings 29, 38, which are further discussed with regard to FIGS 2 and 3a. This embodiment also illustrates a possible bolt 42 and a bracket or plate 40, which will also be discussed below. Near the upper part of FIG. 1a, a fastening arrangement 50, such as a stud and nut can be present. Also plates, disks, or brackets 52, 54 are possible in some embodiments of the invention. Also possible in at least one embodiment of the invention is a connection mechanism 56, and/or a spacing or positioning mechanism 58 preferably for positioning spring 15 against spring plate 17, which positioning mechanism can preferably be made of an elastomer.

Figure 2:
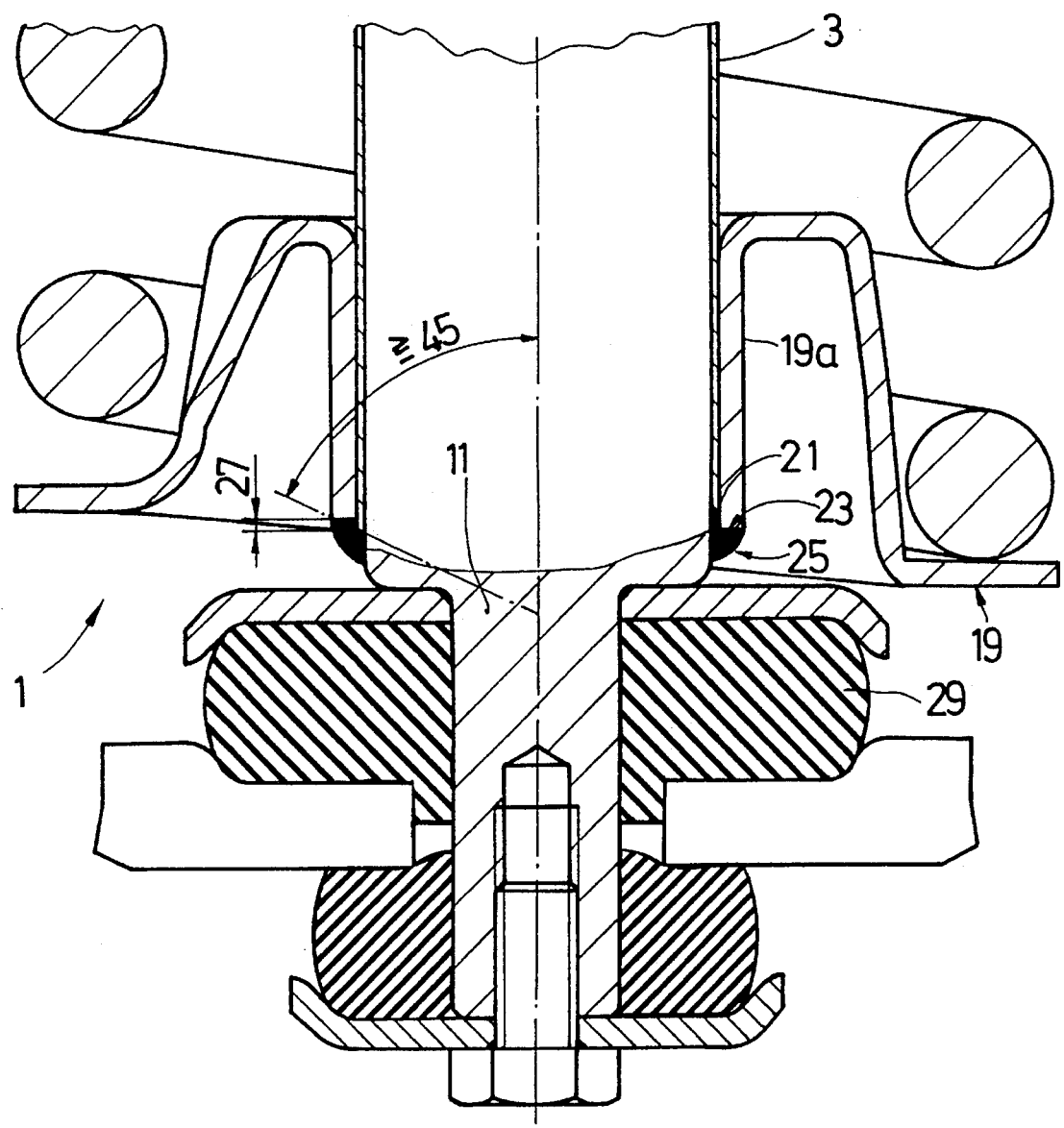
FIG. 2 shows a detailed illustration of a fillet weld configuration.

As shown in FIG. 2, which is essentially limited to an illustration of the vicinity of the base 11 in FIG. 1, the base 11 of the container tube 3 can preferably by partly inserted into the container tube 3. The spring plate 19 is also connected to the base area of the vibration damper 1, preferably by means of a sleeve body 19a. The sleeve body 19a can center the spring plate 19 with respect to the container tube 3. The sleeve body 19a can preferably have a surface 23 which faces a bearing 29. The sleeve body 19a can be thereby axially offset with respect to an end surface 21 of the container tube 3, so that there is preferably a stepped arrangement of the end surfaces 23, 21 of the sleeve body 19a with respect to the container tube 3 and the base 11 respectively. That is, in accordance with one embodiment, the end surface 23 of sleeve body 19a can preferably be form a step-like configuration, or be offset from one another. This step can preferably filled up by a fillet weld 25 which connects essentially all the parts. The rigid base 11 can thereby prevent any distortion caused by the heat generated during the welding process. The offset between end surface 23 and end surface 21 is preferably represented by reference number 27. The inclination of the offset 27 with respect to the longitudinal axis of the vibration damper is thereby greater than or equal to about 45 degrees, so that a compact weld seam 25 can be laid down. When the welding process is being carried out, the heat-sensitive components, such as the rubber bearings 29 among others, have not yet been installed, so that no damage or distortion to such parts can occur.

Figure 2A:
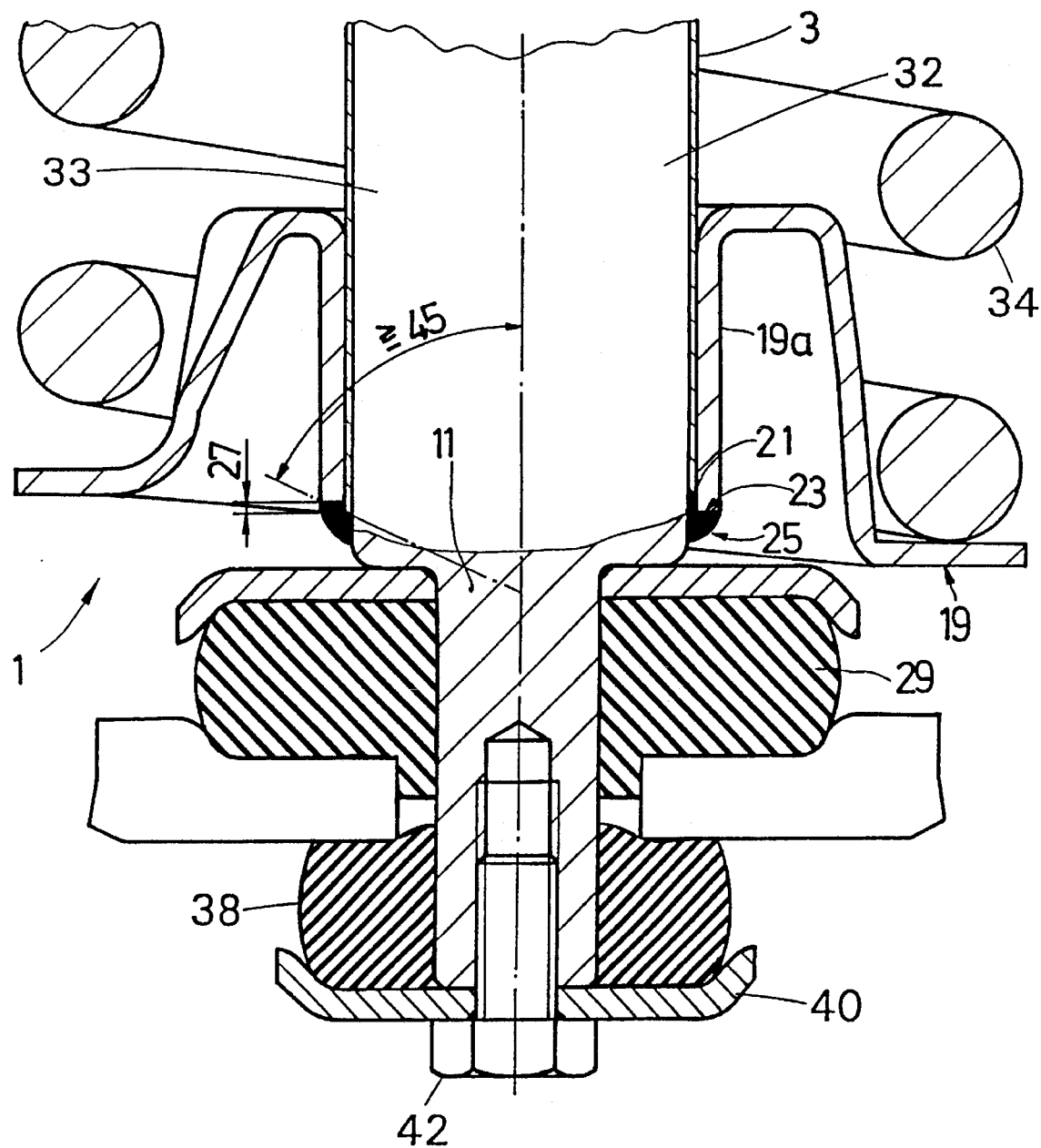
FIG. 2a shows a detailed illustration of a fillet weld configuration.

FIG. 2a is a further embodiment of FIG. 2, illustrating the various possible features or embodiments of the present invention, as discussed above, with reference to FIG. 1a. As mentioned above with regard to FIGS 1 and 1a, FIGS. 2 and 2a can preferably be considered to represent two embodiments of the present invention, one embodiment being shown in the left half, and another embodiment being shown in the right half.

Figure 3:
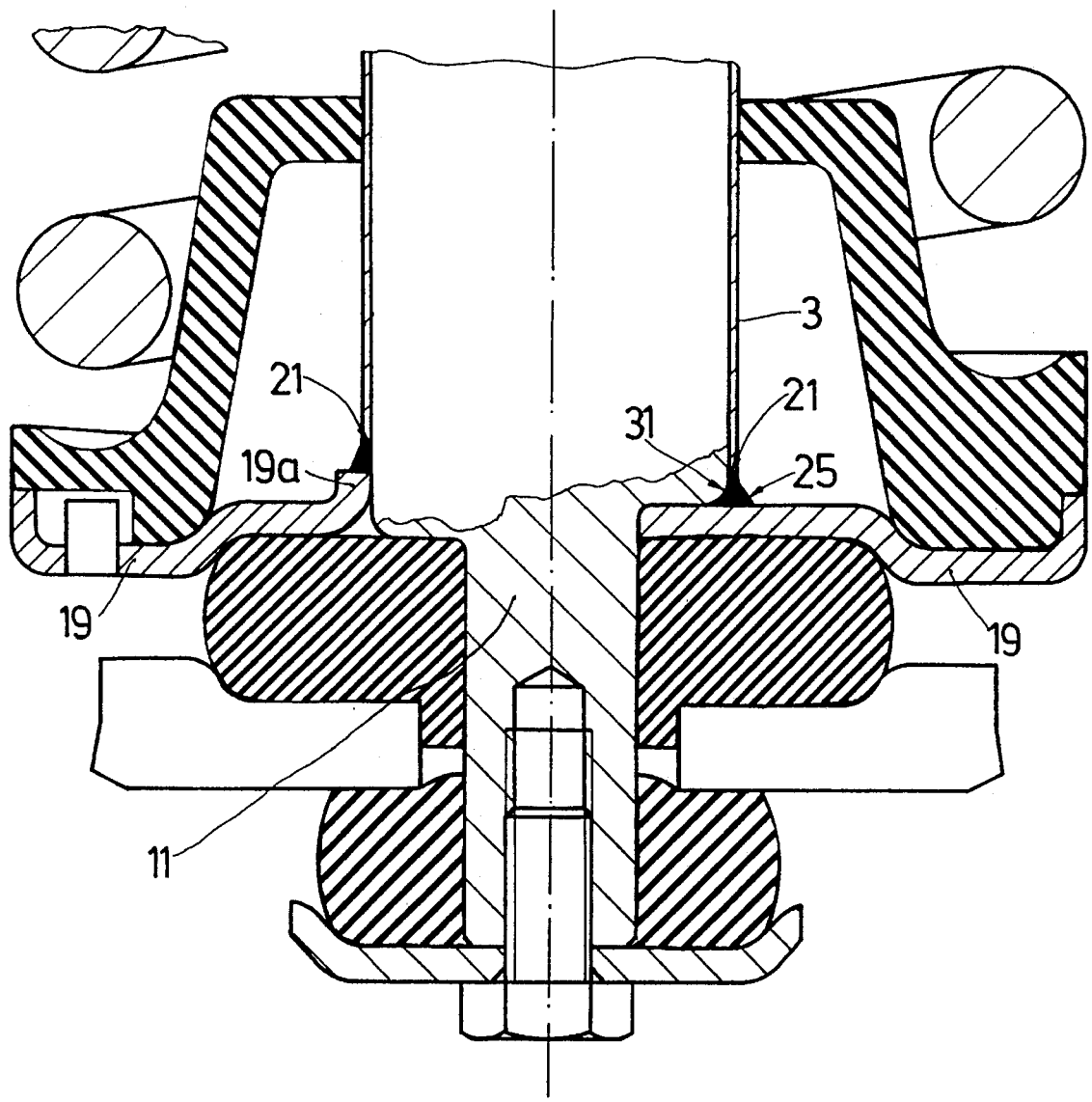
FIG. 3 shows a detailed illustration with a groove for the weld seam system.

FIG. 3 illustrates a variant embodiment of the present invention in which the spring plate 19, the base 11 and the end surface 21 of the container tube 3 preferably form a groove 31, which groove 31 is at least partly filled by the weld metal of the weld configuration 25, so that in turn the base 11, the spring plate 19 and the container tube 3 are connected by means of a weld seam 25. The spring plate 19 essentially requires only a small amount of deformation work.

In the left half of the figure, the centering of spring plate 19a with respect to the container tube 3 can preferably be accomplished by means of a particularly short sleeve body 19a, the end surface 23 (see FIG. 3a), of which is adjacent to the groove 31. The right half of the figure shows a further embodiment of a spring plate 19 which, with the base 11 and the container tube 3, forms the groove 31 for the weld configuration 25. The sleeve body is thus essentially unnecessary, so that there can be advantages in terms of weight and manufacturing costs.

Figure 3A:
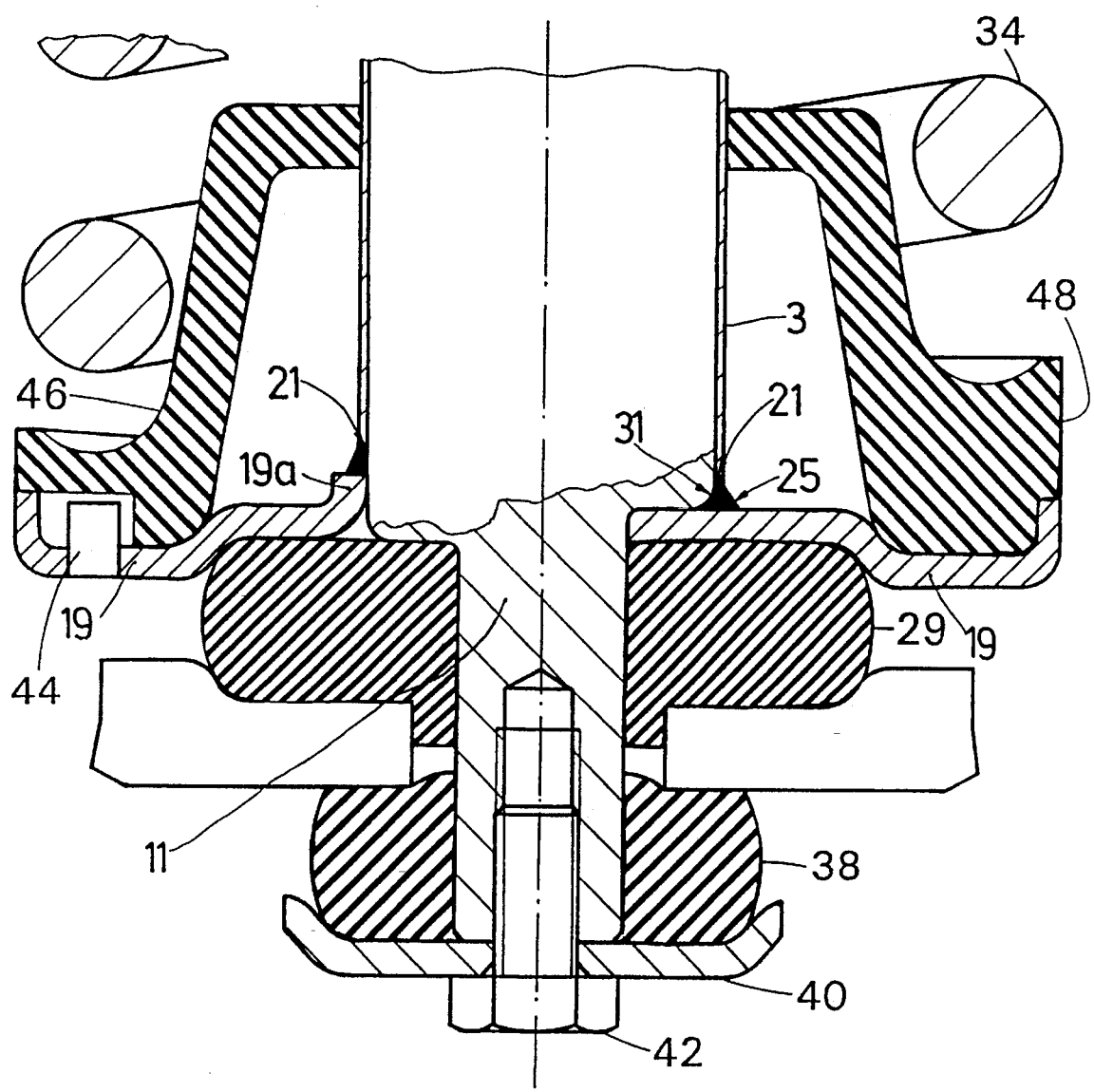
FIG. 3a shows a detailed illustration of one embodiment of FIG. 3.

FIG. 3a is a further embodiment of FIG. 3. In this embodiment the terminal end of the coil spring 34 can be seen. Also present are rubber or elastomer bushings or bearing 29, 36, which are preferably made of an elastomer such as rubber or neoprene, and which can be used to hold or stabilize various parts of the invention. A spring retainer or retention element 46, 48 can also be present to help stabilize the spring plate 19 and/or various other parts. A projection 44, or bolt 42 or bracket or plate 40, are further elements which can possible be present in this or other embodiments of the invention to help hold or stabilize various parts of the invention.

Figure 3B:
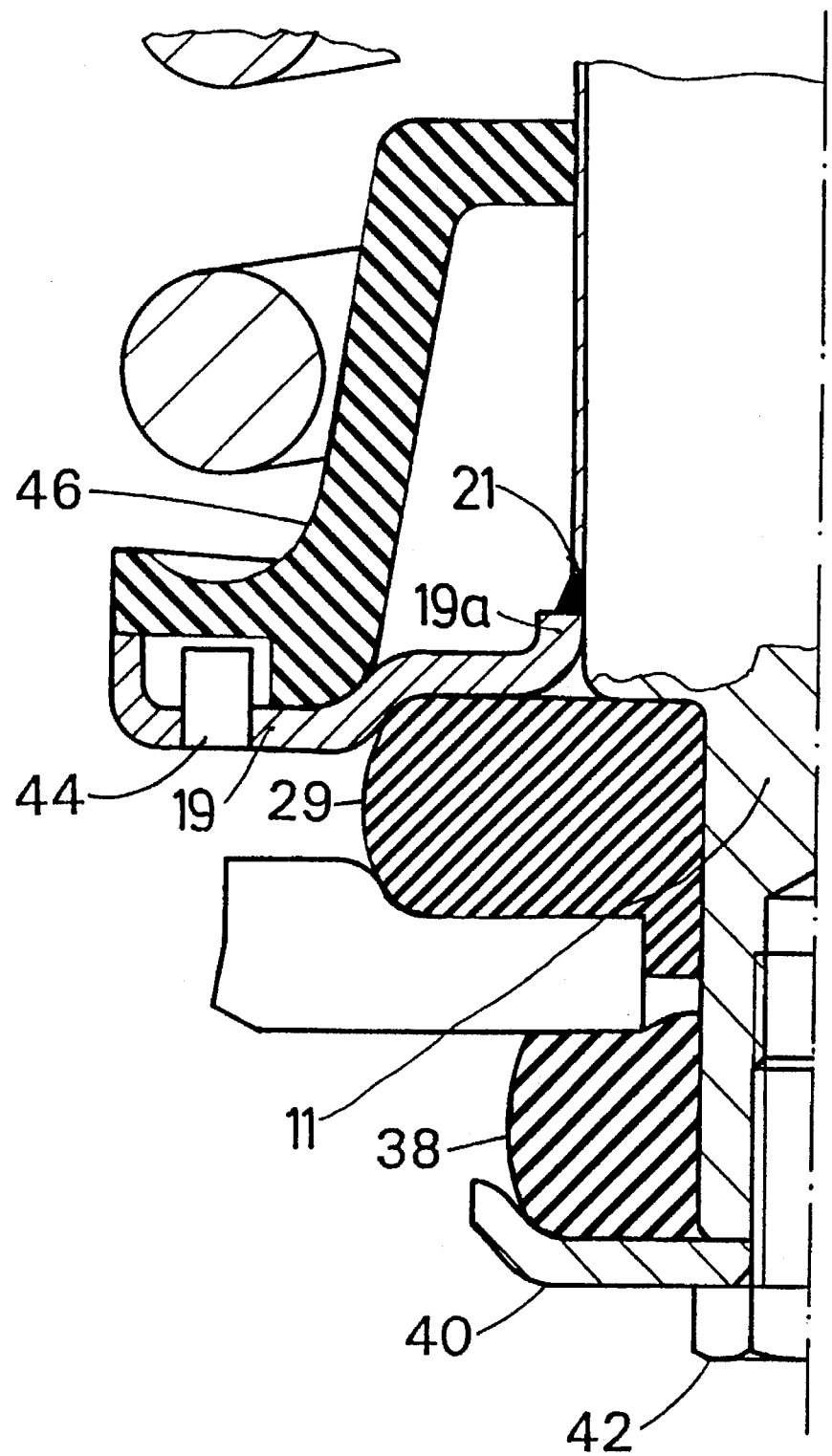
FIG. 3b shows a detailed illustration of one embodiment of FIG. 3.

FIG. 3b is a further illustration of an embodiment similar in some respects to the embodiment illustrated in the left side of FIG. 3. It should be noted that this Figure only illustrates one half of one possible embodiment of the invention, and the other hand may or may not be a mirror image.

Figure 3C:
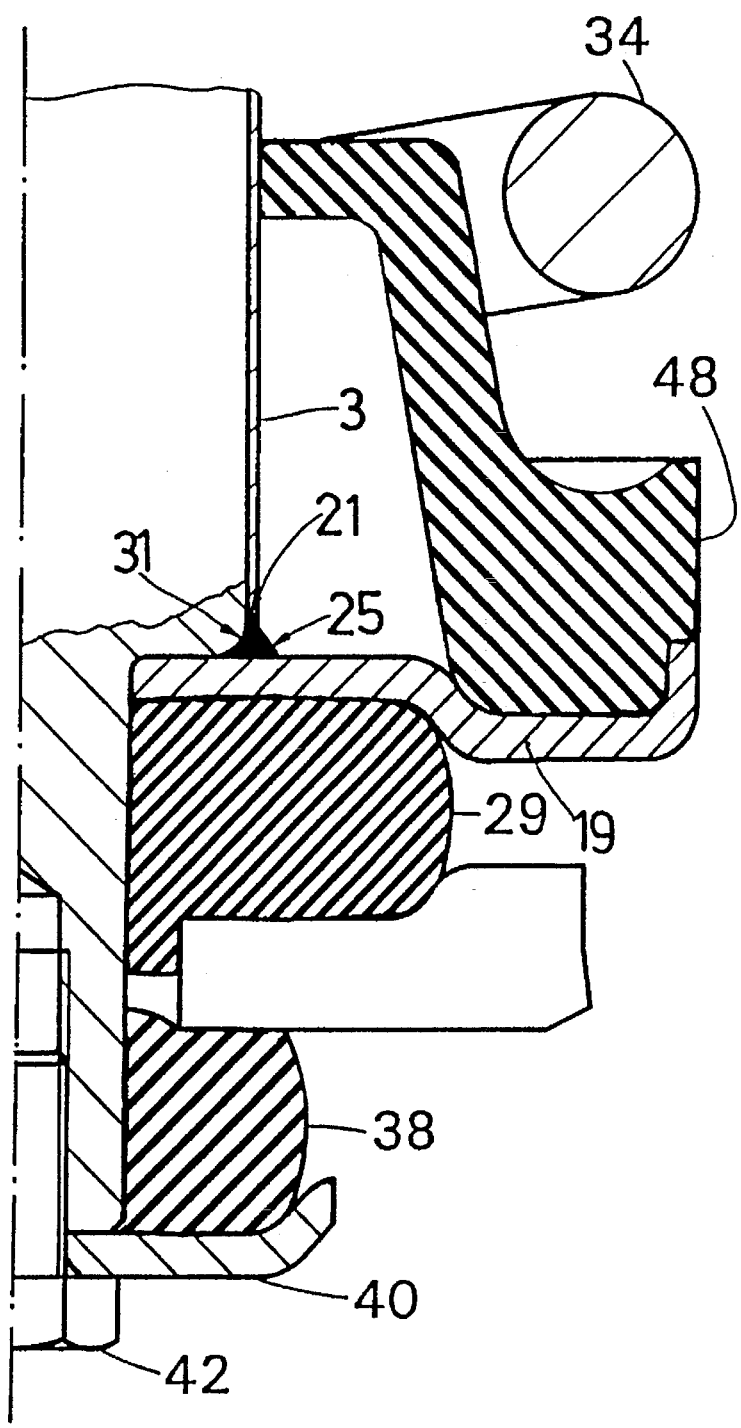
FIG. 3c shows a detailed illustration of one embodiment of FIG. 3.

FIG. 3c is a further illustration of an embodiment similar in some respects to the embodiment illustrated in the right side of FIG. 3. It should be noted that this Figure only illustrates one half of one possible embodiment of the invention, and the other half may or may not be a mirror image.

Figure 4:
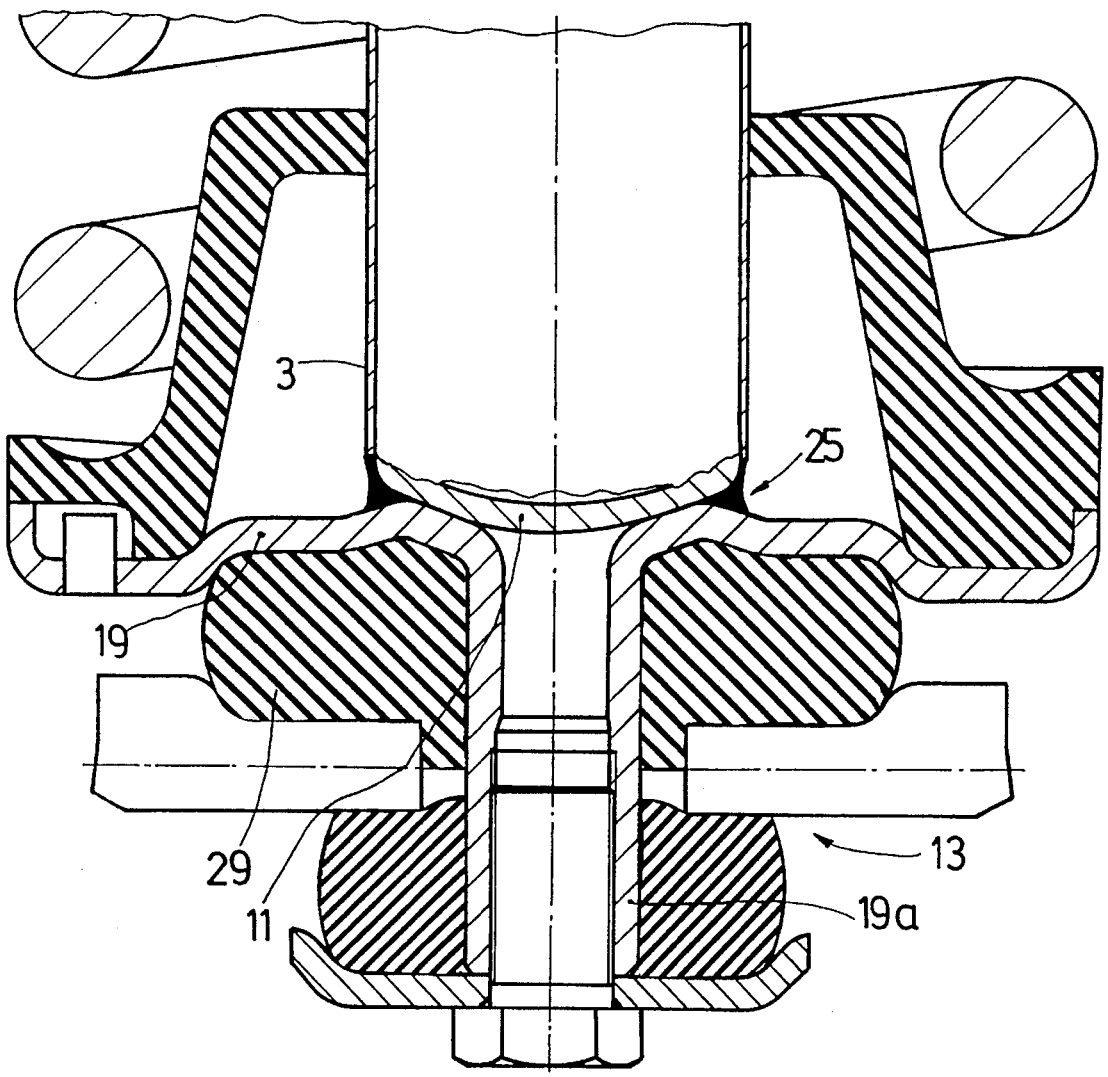
FIG. 4 shows a detailed illustration with a sleeve body as the connection mechanism.

As a variant of the embodiments illustrated in FIG. 3, FIG. 4 shows the sleeve body 19a of the spring plate 19 as a component of the connection mechanism 13. The base 11 can preferably be a simple sheet metal base. The cutting work required as part of the machining of the connection mechanism 13 is limited to a manufacturing operation such as winding, turning on a lathe or using screw making equipment. The spring plate 19 also acts as a guide for the rubber body 29. There is also a weight savings on account of the saving of material on the connection mechanism 13.

Figure 5:
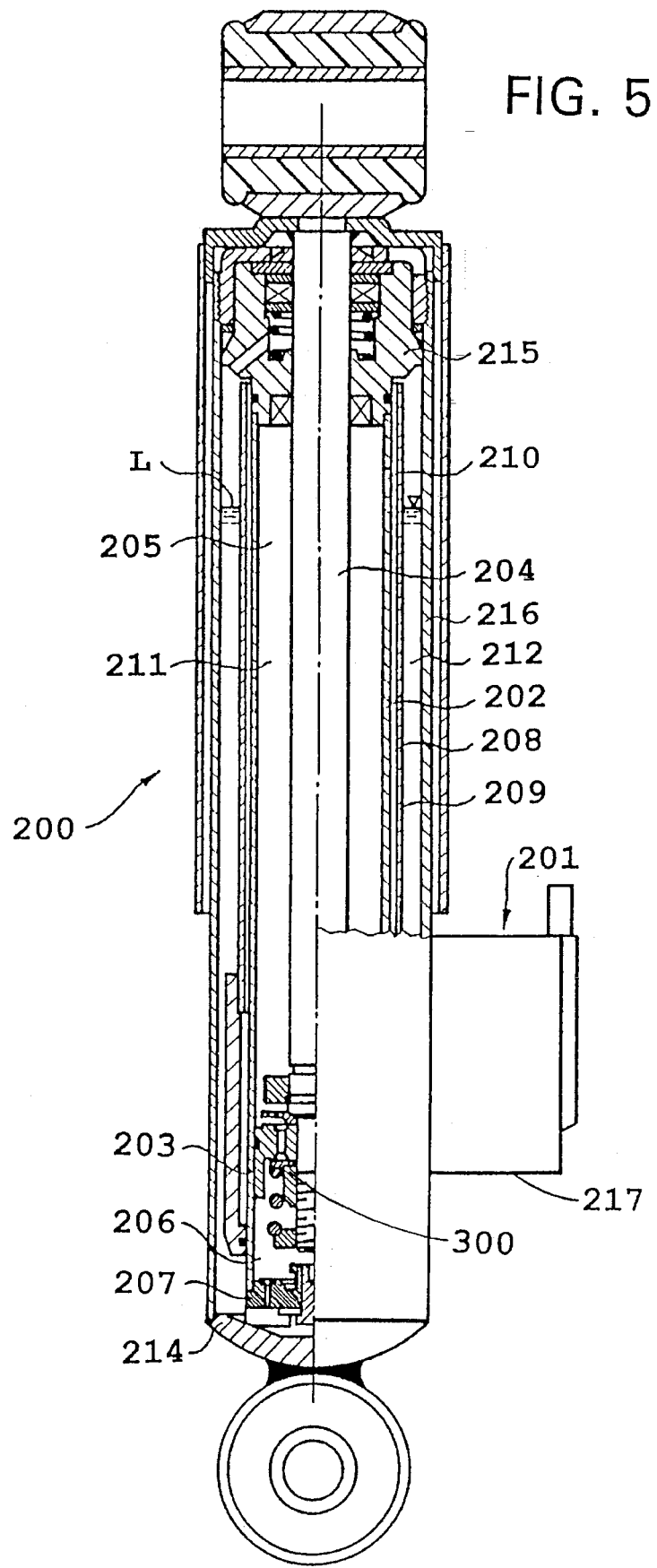
FIG. 5 and FIG. 6 show a typical shock absorber or vibration damper.
Figure 6:
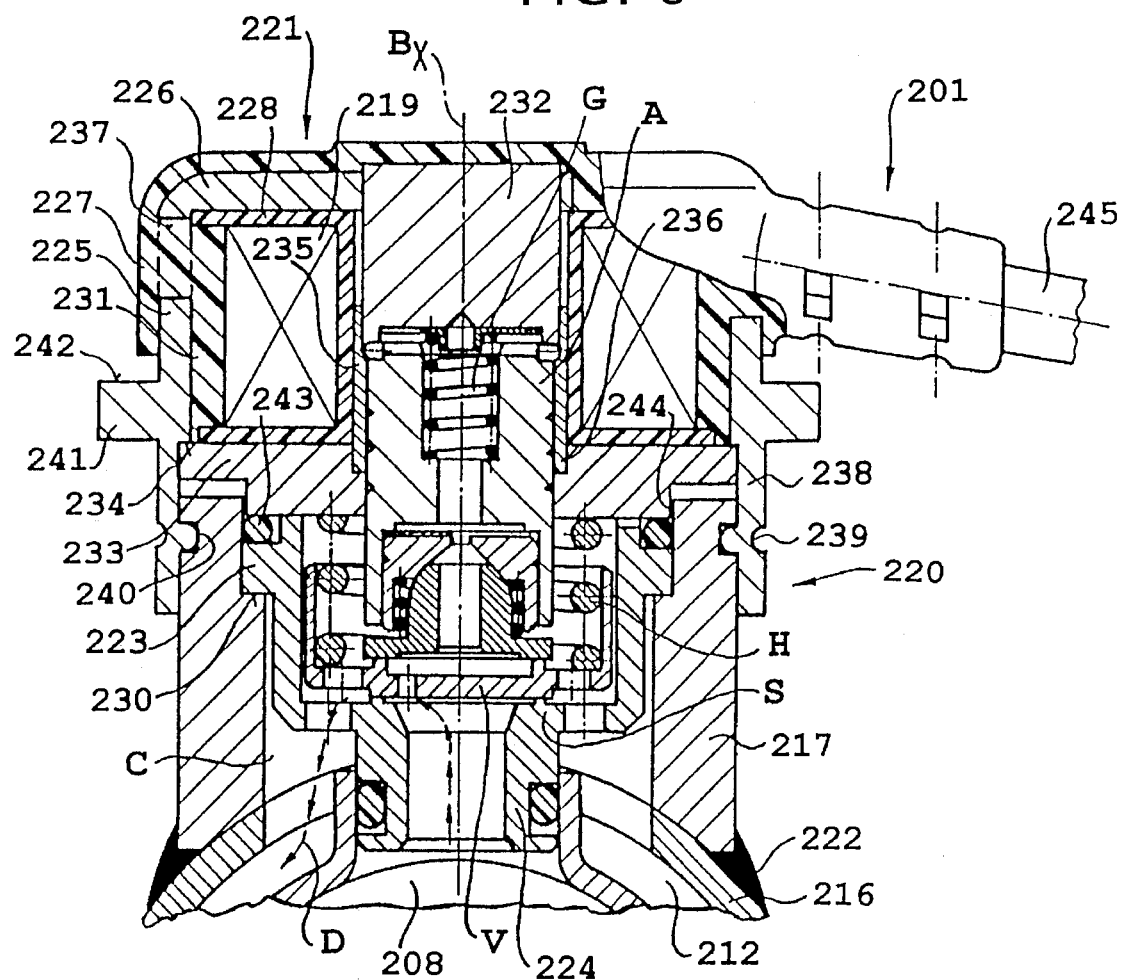

FIGS. 5 and 6 show a typical shock absorber or vibration damper in which the embodiments of the present invention may conceivably be incorporated. It should be understood that the similar components found hereinbelow can be considered to be interchangeable with the components discussed hereinabove with reference to FIGS. 1 through 4.

FIG. 5 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication 300 between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 206 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 6, which will be described later. As long as the valve unit 201 is closed, the bypass established by the connecting orifice 210, the fluid path 308 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 108, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 6 one can again see the fluid path 208 and the compensating chamber 212, which are interconnectable through the valve unit 201. The fluid path 208 is connected to the upper working chamber 211 as shown in FIG. 5. The flow direction from the fluid path 208 to the compensating chamber 212 across the valve unit 201 is indicated in FIG. 6 by the dotted line D provided with arrows indicating the flow direction both for inward movement and outward movement of the piston rod 204 with respect to the pressure pipe 202. One can see in FIG. 6, a valve member V which can be lifted with respect to a valve seat S, such as to open the flow path D from the fluid path 208 to the compensating chamber 212.

For explaining the principles of the embodiment of the present invention shown in FIGS. 5 and 6, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provide with a pretensioning flange 241. The pretensioning flange 241 offers a pretension face 242. The cover unit 221 can be pretensioned in downward direction as shown in FIG. 6 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

In yet another embodiment of the present invention, an adhesive material such as epoxy or super glue or a similar other metal adhesive could be used as a connection in place of a weld.

One feature of the invention resides broadly in the vibration damper which has a container tube which is closed on one end by a container base, whereby a suspension spring which encloses the vibration damper is supported on a spring plate, with connection mechanisms to the container tube and to a piston rod which moves axially inside the container tube, characterized by the fact that the spring plate 19, 19a, the container base 11 and the container tube 3 are connected to one another by means of a common weld configuration 25.

Another feature of the invention resides broadly in the vibration damper characterized by the fact that the spring plate 19 has a sleeve body 19a which encloses the container tube 3, whereby the sleeve body 19a is oriented so that the base-side end surface 23 of the sleeve body 19a assumes an axial offset from the end surface 21 of the container tube 3, and that the base 11 is fitted into the container tube 3, whereby a portion of the base 11 extends axially outside the container tube 3, and connects the weld configuration 25 to the base 11 at least by means of the end surfaces 21, 23.

Yet another feature of the invention resides broadly in the vibration damper characterized by the fact that the axial offset 27 is selected so that the weld configuration 25 is realized at an angle of greater than or equal to 45 degrees with respect to the principal axis of the vibration damper.

Still another feature of the invention resides broadly in the vibration damper characterized by the fact that the spring plate 19 with the portion 11 of the base extending outside the container 3 and the end surface 21 of the container tube 3 form a groove 31, inside which the weld configuration 25 is realized.

A further feature of the invention resides broadly in the vibration damper characterized by the fact that the sleeve body 19a of the spring plate 19 is a component of the connection mechanism 13 on the container tube side.

The components disclosed in the various publications, disclosed or incorporated by reference herein, may be used in the embodiments of the present invention, as well as, equivalents thereof.

Examples of spring plates or spring seats which may be utilized with an embodiment of the present invention can be found in the following: U.S. Pat. No. 4,774,876, entitled "Sprung suspension of an actuating piston;" U.S. Pat. No. 5,326,084, entitled "One piece bearing unit sleeve for suspension member;" U.S. Pat. No. 5,265,902, entitled "Vehicle suspension member;" U.S. Pat. No. 5,211,420, entitled "Adjustable height suspension mechanism for two-wheeled motor vehicle;" U.S. Pat. No. 5,303,985, entitled "Cast one-piece axle housing;" and U.S. Pat. No. 5,246,215, entitled "Spring seat member with notch for ground spring end."

Examples of suspension systems in which the present invention may be utilized can be found on pages 568 through 588 of the *Automotive Encyclopedia*, authored by William K. Toboldt, Larry Johnson, and Steven W. Olive, published by The Goodheart-Willcox Company, Inc., in 1989.

Examples of shock absorber assemblies and components associated therewith, which may be utilized in accordance with the embodiments of the present invention, may be found in the following U.S. Pat. Nos.: 4,986,393, which issued to Preukschat et al. on Jan. 22, 1991; 4,749,070, which issued to Moser et al. on Jun. 7, 1988; and 4,723,640, which issued to Beck on Feb. 9, 1988.

All, or substantially all, of the components and methods of the various embodiments may be used with at least one embodiment or all of the embodiments, if more than one embodiment is described herein.

All of the patents and publications recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a motor vehicle, said vibration damper comprising:

a tube;

a chamber disposed at least partially within said tube, said chamber containing a damping fluid;

a piston rod sealingly projecting into said chamber and being axially displaceable within said chamber;

a piston being attached to said piston rod, said piston being slidably disposed within said chamber to sealingly divide said chamber into first and second work chambers;

means for permitting fluid communication between said first chamber and said second chamber;

said tube comprising a first end and a second end;

said first and second end being disposed a substantial distance from one another;

said chamber being substantially disposed between said first end and said second end of said tube;

said chamber having a first end and a second end;

said first end of said chamber being disposed near said first end of said tube;

said second end of said chamber being disposed near said second end of said tube;

said first end comprising first means for connecting said vibration damper to a first body;

said second end comprising second means for connecting said vibration damper to a second body;

a spring for extending said vibration damper;

said spring comprising a first end and a second end;

a spring plate disposed at said first end of said spring;

said tube having an outer portion surrounding at least a portion of said chamber;

a base being disposed at said first end of said tube for sealing said first end of said tube;

said spring plate being disposed at said first end of said tube;

each of said base, said spring plate and said tube having a surface area; and a continuous weld contacting and connecting each of said surface areas of said base, said spring plate and said tube at said first end of said tube.

2. A vibration damper according to claim 1, wherein said weld comprises a sole weld.

3. A vibration damper according to claim 2, wherein said spring plate comprises a sleeve;

said sleeve surrounds said tube and is disposed a substantial distance along said first end of said tube.

4. A vibration damper according to claim 3, wherein said sleeve is disposed and configured such that at least a portion of said sleeve is disposed a predetermined distance from said first end of said tube.

5. A vibration damper according to claim 4, wherein said base is disposed into said first end of said tube; and a portion of said base extends axially outside said first end of said tube.

6. A vibration damper according to claim 5, wherein said sleeve connects said weld to said base at least to one end surface of said tube.

7. A vibration damper according to claim 6, wherein:

said spring plate comprises a radially extending portion;

said radially extending portion extending from said sleeve of said spring plate;

said sleeve having a first end and a second end;

said radially extending portion having a first end and a second end;

said first end of said radially extending portion being disposed against said first end of said sleeve;

said second end of said radially extending portion being disposed outwardly and away from said sleeve;

said spring plate further comprising another portion;

said another portion comprising at least a part extending substantially concentrically about said sleeve;

said another portion having a first end and a second end;

said first end of said another portion being disposed adjacent to said second end of said radially extending portion;

said second end of said another portion extending generally towards said first connecting means;

said another portion having another part;

said another part comprises a conical portion;

said conical portion being disposed adjacent to said second end of said another portion;

said spring plate further comprises yet another portion;

said yet another portion extending substantially radially from said conical portion of said another part;

said yet another portion being in contact with said first end of said spring.

8. A vibration damper according to claim 1, wherein said spring plate comprises a sleeve;

said sleeve surrounds said tube and is disposed a substantial distance along said first end of said tube.

9. A vibration damper according to claim 1, wherein said spring plate comprises a sleeve;

said sleeve surrounds said tube and is disposed a substantial distance along said first end of said tube.

10. A vibration damper according to claim 9, wherein said sleeve is disposed and configured such that at least a portion of said sleeve is disposed a predetermined distance from said first end of said tube.

11. A vibration damper according to claim 10, wherein said base id disposed into said first end of said tube; and a portion of said base extends axially outside said first end of said tube.

12. A vibration damper according to claim 11, wherein said sleeve connects said weld to said base at least to one end surface of said tube.

13. A vibration damper according to claim 12, wherein said tube has a principal longitudinal axis;

a portion of said principal longitudinal axis extends from said first end of said tube to said second end of said tube;

the end surface of said tube is disposed substantially adjacent to said first end of said tube and the end surface of said spring plate is disposed substantially adjacent to said first end of said spring plate defining a line projecting through said end surfaces;

said line projecting generally toward said second end of said tube;

said line making an angle with respect to said portion of said longitudinal axis;

said angle being at least 45 degrees.

14. A vibration damper according to claim 1, wherein said spring plate, said base and said first end of said tube form a groove;

said weld being disposed within said groove.

15. A vibration damper according to claim 14, wherein said first means for connecting said vibration damper to a first body comprises a portion of said spring plate;

said portion of said spring plate projecting substantially perpendicular to said longitudinal axis.

16. A vibration damper according to claim 15, wherein said vibration damper comprises a first bushing;

said first bushing being disposed between said spring plate and said spring;

a portion of said spring plate forming a portion of said first means for connecting said vibration damper to a first body.

17. A vibration damper according to claim 16, wherein said vibration damper comprises a second bushing;

said second bushing being disposed between the combination of a portion of said spring plate and a portion of said base;

said spring plate and said second bushing forming a part of said first means for connecting said vibration damper to a first body.

18. A vibration damper according to claim 15, wherein said vibration damper comprises a first bushing;

said bushing being disposed between the combination of a portion of said spring plate and a portion of said base;

said spring plate and said first bushing forming a part of said first means for connecting said vibration damper to a first body.

19. A vibration damper according to claim 18, wherein said vibration damper comprises a second bushing;

said second bushing having a hole therein;

said spring plate having a portion being disposed in and through said hole;

said spring plate and said second bushing forming a portion of said first means for connecting said vibration damper to a first body.

* * * * *

UNITED STATES PATENT AND TRADEMARK OFFICE
CERTIFICATE OF CORRECTION

PATENT NO. : 5,544,725
DATED : August 13, 1996
INVENTOR(S) : Günther HANDKE and Georg MEMMEL It is certified that error appears in the above-indentified patent and that said Letters Patent is hereby corrected as shown below:

In column 3, line 46, after 'can', delete "than" and insert --then--.

In column 4, line 11, after 'preferably', delete "by" and insert --be--.

In column 4, line 24, before 'form' delete "be".

In column 4, line 25, after 'preferably' insert --be--.

In column 4, line 38, after 'FIG.', delete "2ais" and insert --2a is--.

In column 5, line 8, after 'can', delete "possible" and insert --possibly--.

In column 6, line 33, after 'path', delete "308" and insert --208--.

In column 8, line 3, after 'is', delete "provide" and insert --provided--.

In column 9, line 21, after 'piston;"' insert --U.S. Patent No. 4,655,439, entitled "Shock strut for a vehicle;"--.

UNITED STATES PATENT AND TRADEMARK OFFICE
CERTIFICATE OF CORRECTION

PATENT NO. : 5,544,725
DATED : August 13, 1996
INVENTOR(S) : Günther HANDKE and George MEMMEL It is certified that error appears in the above-indentified patent and that said Letters Patent is hereby corrected as shown below:

In column 11, line 28, Claim 11, after 'base', delete "id" and insert --is--.

Signed and Sealed this

Eighteenth Day of February, 1997

Attest:

BRUCE LEHMAN

Attesting Officer

Commissioner of Patents and Trademarks